(12) United States Patent
Leitch (10) Patent No.: US 7,978,049 B2
(45) Date of Patent: Jul. 12, 2011

(54) TIME-OF-FLIGHT RANGING SYSTEMS USING COARSE AND FINE MEASUREMENTS

(75) Inventor: Adam S. Leitch, Brighton (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 986 days.

(21) Appl. No.: 11/571,672

(22) PCT Filed: Jul. 6, 2005

(86) PCT No.: PCT/IB2005/052247
§ 371 (c)(1),
(2), (4) Date: Jan. 5, 2007

(87) PCT Pub. No.: WO2006/006133
PCT Pub. Date: Jan. 19, 2006

(65) Prior Publication Data
US 2008/0284564 A1    Nov. 20, 2008

(30) Foreign Application Priority Data
Jul. 7, 2004  (GB) .................................. 0415219.5

(51) Int. Cl.
*G01S 13/76* (2006.01)
(52) U.S. Cl. ............... 340/5.72; 340/686.6; 340/539.23; 342/458
(58) Field of Classification Search .................. 340/572, 340/5.72, 686.6, 539.23; 342/47, 129–131, 342/136–138, 357.01–357.04, 357.09, 458
See application file for complete search history.

(56) References Cited

U.S. PATENT DOCUMENTS

| | | | | |
|---|---|---|---|---|
| 4,107,674 | A | * | 8/1978 | Funatsu et al. .................. 342/32 |
| 4,757,315 | A | * | 7/1988 | Lichtenberg et al. ......... 342/125 |
| 5,087,918 | A | * | 2/1992 | May et al. ....................... 342/85 |
| 5,280,285 | A | * | 1/1994 | Curtis et al. ..................... 342/32 |

(Continued)

FOREIGN PATENT DOCUMENTS

DE    10238887 A1    3/2004

(Continued)

OTHER PUBLICATIONS

International Search Report of International Application No. PCT/IB2005/052247 Contained in the International Publication No. WO2006006133.

(Continued)

*Primary Examiner* — Daniel Wu
*Assistant Examiner* — Nay Tun (57) ABSTRACT

A time-of-flight ranging system, such as a keyless access Control system, comprises a first part and a second part, e.g., a portable device such as a key fob. Both parts have a transceiver for effecting communication with each other. At least the first part includes a device, e.g., a processor, for determining the distance between the two parts based on time-off-light. To save power, when the two parts are a relatively great distance apart, a time-of-flight measuring device computes the time based on a relatively coarse algorithm, and when the parts are relatively close, the computation is carried-out using a more precise algorithm. The clock frequency may be reduced when the two parts are a relatively great distance apart, and increased when they are closer. Further the transmitter power may be reduced when the two parts are relatively close together and increased when they are a relatively great distance apart.

12 Claims, 4 Drawing Sheets

U.S. PATENT DOCUMENTS

| | | | | |
|---|---|---|---|---|
| 5,517,189 | A * | 5/1996 | Bachhuber et al. | 340/5.64 |
| 5,723,911 | A * | 3/1998 | Glehr | 340/10.5 |
| 6,101,428 | A * | 8/2000 | Snyder | 701/2 |
| 6,346,878 | B1 * | 2/2002 | Pohlman et al. | 340/435 |
| 6,552,649 | B1 * | 4/2003 | Okada et al. | 340/5.61 |
| 6,674,396 | B2 * | 1/2004 | Richards et al. | 342/125 |
| 6,744,398 | B1 * | 6/2004 | Pyner et al. | 342/125 |
| 6,753,950 | B2 * | 6/2004 | Morcom | 356/4.01 |
| 6,803,851 | B1 * | 10/2004 | Kramer et al. | 340/5.61 |
| 6,892,131 | B2 * | 5/2005 | Coffee et al. | 701/200 |
| 6,922,166 | B2 * | 7/2005 | Richards et al. | 342/125 |
| 6,946,949 | B2 * | 9/2005 | Heide et al. | 340/5.61 |
| 7,202,941 | B2 * | 4/2007 | Munro | 356/5.01 |
| 7,319,777 | B2 * | 1/2008 | Morcom | 382/104 |
| 7,391,368 | B1 * | 6/2008 | Gao et al. | 342/387 |
| 7,466,219 | B2 * | 12/2008 | Ishimura et al. | 340/435 |
| 7,489,993 | B2 * | 2/2009 | Coffee et al. | 701/35 |
| 7,499,150 | B2 * | 3/2009 | Lewis et al. | 356/5.01 |
| 7,592,918 | B2 * | 9/2009 | Karr | 340/572.1 |
| 2001/0033222 | A1 * | 10/2001 | Nowottnick et al. | 340/5.61 |
| 2003/0048430 | A1 * | 3/2003 | Morcom | 356/5.01 |
| 2003/0090365 | A1 * | 5/2003 | Bergerhoff | 340/5.61 |
| 2003/0222757 | A1 * | 12/2003 | Ghabra et al. | 340/5.72 |
| 2004/0075823 | A1 * | 4/2004 | Lewis et al. | 356/5.01 |
| 2005/0020275 | A1 * | 1/2005 | Agrawala et al. | 455/456.1 |
| 2006/0142913 | A1 * | 6/2006 | Coffee et al. | 701/35 |
| 2007/0161383 | A1 * | 7/2007 | Caci | 455/457 |
| 2008/0100822 | A1 * | 5/2008 | Munro | 356/4.01 |
| 2008/0129979 | A1 * | 6/2008 | Magnusson | 356/5.01 |
| 2008/0157929 | A1 * | 7/2008 | Hilgers et al. | 340/10.3 |
| 2009/0006032 | A1 * | 1/2009 | Wilcox et al. | 702/176 |
| 2009/0075590 | A1 * | 3/2009 | Sahinoglu et al. | 455/39 |
| 2009/0088924 | A1 * | 4/2009 | Coffee et al. | 701/33 |
| 2009/0201152 | A1 * | 8/2009 | Karr et al. | 340/545.6 |

FOREIGN PATENT DOCUMENTS

| | | |
|---|---|---|
| EP | 1152109 A2 | 11/2001 |
| WO | WO2006006133 A1 | 1/2006 |

OTHER PUBLICATIONS

Written Opinion of the International Searching Authority for International Application No. PCT/IB2004/051316.

"Passive Keyless Entry (PKE)" Philips Semiconductors Document No. 9397 750 10317, Date of Release: Oct. 2002.

* cited by examiner

TIME-OF-FLIGHT RANGING SYSTEMS USING COARSE AND FINE MEASUREMENTS

The present invention relates to improvements in or relating to time-of flight ranging systems and to applications using such systems. A particular, but not exclusive, application of the present invention is in keyless entry systems, for example passive keyless entry systems used in the automotive market and to a vehicle security system.

For convenience of description, the present invention will be described with reference to vehicle entry systems.

Figure 1:
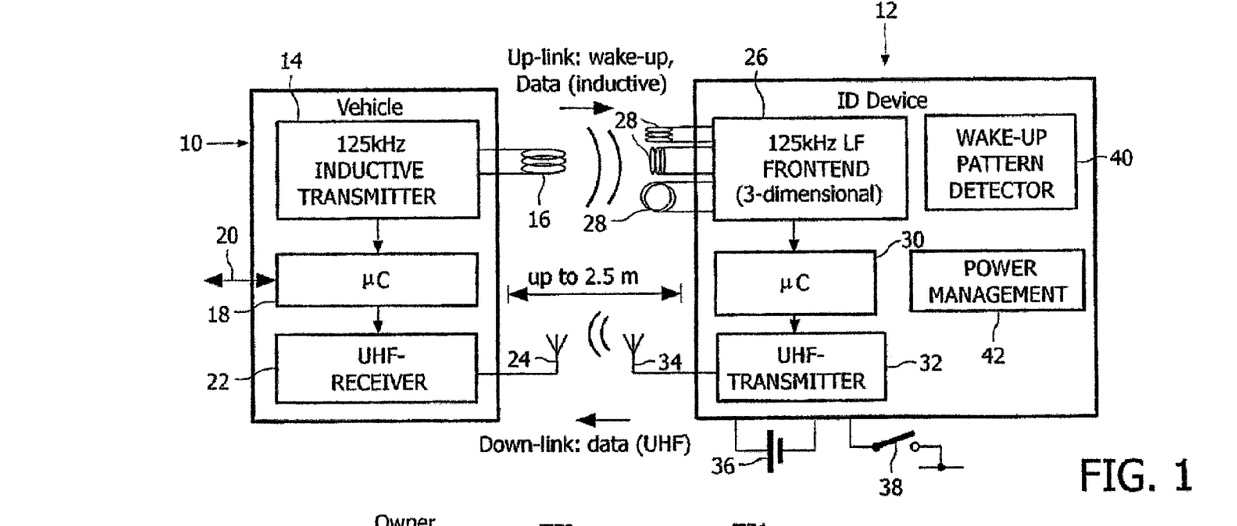
FIG. 1 is a block schematic diagram of a passive keyless entry system.

Philips Semiconductors in a document number 9397 750 10317, released October 2002, and available on the world wide web at semiconductors.philips.com/acrobat/literature/9397/75010 317.pdf, discloses a vehicular passive keyless entry system. A block schematic diagram of this known passive keyless entry system is shown in FIG. 1 of the accompanying drawings. The system comprises a vehicle mounted first part 10 and a portable second part 12 which may be incorporated into a key fob, access card or other suitably small device. The vehicle mounted part 10 comprises a 125 kHz inductive transmitter 14 having a signal output coupled to an antenna 16 in the form of an inductive coil. The transmitter 14 is operative at least while the vehicle doors are locked. A microcontroller 18 is provided having an input coupled to an output of the inductive transmitter 14, an input/output 20 coupled to output locking/unlocking devices (not shown), such as door locks, boot (or trunk) locks, bonnet (or hood) locks and engine ignition security devices, and an output coupled to a UHF receiver 22. An antenna 24 is coupled to the receiver.

The portable part 12, which constitutes an ID device, comprises a 125 kHz LF front end stage 26 having a three dimensional input consisting of three orthogonally related inductive coils 28. A microcontroller 30 has an input coupled to an output of the front end stage 26 and an output coupled to a UHF transmitter 32 having an antenna 34. The portable part 12 also includes connections for connecting to a battery 36, and on/off switch 38, a wake-up pattern detector 40 and a power management stage 42.

The illustrated system allows drivers to enter their vehicles without any explicit action to unlock them as authorization is granted simply by carrying the appropriate portable part or ID device 12. As a driver comes within an operating area, say less than 2.5 metres, of the vehicle and places his/her hand on the door handle causing the inductive transmitter 14 to generate a challenge signal. The front end stage 26 receives the challenge signal which causes the portable part 12 to be woken-up. Once woken the microcontroller 30 analyses the challenge signal and once satisfied that it is directed to it, a response signal is compiled, encrypted if thought necessary, and passed to the UHF transmitter 32 for onward transmission to the UHF receiver 22.

The microcontroller 18 in the vehicle mounted part 10 compares the signal received by the UHF receiver 22 with internally stored information and, if authentication is successful, unlocks the vehicle door. The entire process takes only a few milliseconds from start to finish As a refinement, once the driver has gained access to the inside of the vehicle, the authentication procedure may be repeated and if successful the engine can be started by simply pressing the start button.

Finally after leaving the vehicle, it can be locked by simply pressing the door handle. Before locking a check is made to ensure that the portable part 12 is outside the vehicle.

Figure 2:
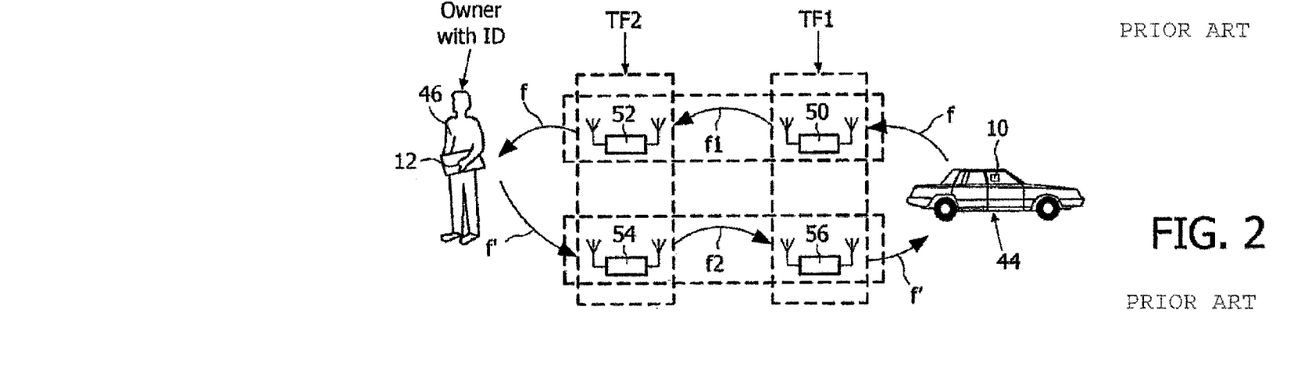
FIG. 2 illustrates diagrammatically how a relay attack can be effected.

Since the introduction of such a system a flaw, termed "relay attack", has been discovered whereby two persons equipped with suitable radios capable of transmitting over distances greater than that achievable by the transmitter 32 in the portable part 12 can cheat the system into believing that the vehicle owner is gaining entry to his own vehicle. FIG. 2 illustrates diagrammatically how such a relay attack may be effected. A first thief TF1 equipped with two radio transceivers 50, 56 positions himself/herself close to a vehicle 44 containing the vehicle part 10 and a second thief TF2 equipped with two radio transceivers 52, 54 positions himself/herself close to the vehicle's owner 46 who has the portable part 12 on their person. The first thief TF1 presses the door handle of the vehicle 44 causing the inductive transmitter 14 to generate a challenge signal having a frequency f. Signal frequency f is received by the transceiver 50 and is relayed as frequency f1 to the transceiver 52 carried by the second thief TF2. The signal is reconverted to the frequency f which is detected by the front end stage 26 in the portable part. The UHF transmitter 32 transmits a UHF signal having a frequency f' which is picked-up by the transceiver 54 and is forwarded as frequency f2 to the transceiver 56, the latter transceiver converts the signal back to the UHF frequency f' which is transmitted to the receiver 22 in the vehicle part 10 causing the microcontroller 18 to unlock the door. If necessary the operation is repeated to enable the vehicle's engine to be started. The owner of the vehicle 44 is unaware of what has happened until he/she returns to find their vehicle missing.

One method which has been proposed to defeat relay attack is to make the system sensitive to an excessive time delay between the generation of, and reception of, signals between the vehicle part 10 and the portable part 12 and inhibit operation of the locks and any other security devices. The excessive time delay occurs due to the extended round trip time by way of the transceivers 50, 52, 54, and 56.

Accurately calculating the time-of-flight is computationally intensive because several variables such as accuracy of clock generators and clock offsets have to be taken into account. Correlating across large amounts of data is time consuming and having a receiver, such as the receiver 22, energised for relatively large amounts of time consumes battery current which is undesirable.

It is an object of the present invention to operate a time-of-flight ranging system more effectively.

According to a first aspect of the present invention there is provided a method of operating a time-of-flight ranging system comprising first and second stations having transmitting and receiving means, the method comprising the first station measuring the time-of-flight of a signal between the first and second stations, calculating the time-of-flight using a relatively coarse algorithm when the second station is relatively far from the first station and calculating the time-of-flight in accordance with a relatively precise algorithm when the second station is relatively close to the first station.

According to a second aspect of the present invention there is provided a time-of-flight ranging system comprising first and second stations, each of the first and second stations having transmitting and receiving means for communicating with each other, and control means, characterised by the first station further comprising time-of-flight measuring means for determining the distance between itself and the second station, the measuring means being adapted to calculate time-of-flight in accordance with a relatively coarse algorithm when the second station is relatively far from the first station and to calculate time-of-flight in accordance with a relatively precise algorithm when the second station is relatively close to the first station.

The present invention is based on recognising that when a user is a relatively large distance, say greater than 5 metres, from a vehicle the calculation of the time-of-flight can be done using a relatively coarse algorithm consuming less current and time but when the user is closer to the vehicle the calculation of the time-of-flight needs to be done using a more precise algorithm which consumes more current and time.

In one embodiment of the present invention the first and second stations are capable of producing low and high clock frequencies for use in respectively calculating the time-of-flight coarsely and with precision. As the UHF transmission frequency is unchanged different multiplier ratios are used to produce this frequency from the clock generators.

In another embodiment of the present invention one or both of the first and second stations has or have transmitting power management means for adjusting the transmitting power between at least a first, high level when the relatively coarse algorithm is being used to calculate time-of-flight and a second, low level when the relatively precise algorithm is being used to calculate time-of-flight.

According to a third aspect of the present invention there is provided a keyless access control system comprising first and second stations, each of the first and second stations having transmitting and receiving means for communicating with each other, and control means, characterised by the first station further comprising time-of-flight measuring means for determining the distance between itself and the second station, the measuring means being adapted to calculate time-of-flight in accordance with a relatively coarse algorithm when the second station is relatively far from the first station and to calculate time-of-flight in accordance with a relatively precise algorithm when the second station is relatively close to the first station.

According to a fourth aspect of the present invention there is provided a vehicle security system comprising lockable security means responsive to locally generated signals and a keyless access control system comprising a fixed first part to be mounted in a vehicle and a portable second part to be carried by a vehicle user, both said parts having signal transmitting and receiving means for effecting communication with each other, and control means, characterised by the fixed first part further comprising time-of-flight measuring means for determining the distance between itself and the second station, the measuring means being adapted to calculate time-of-flight in accordance with a relatively coarse algorithm when the second station is relatively far from the first station and to calculate time-of-flight in accordance with a relatively precise algorithm when the second station is relatively close to the first station.

The present invention will now be described, by way of example, with reference to the accompanying drawings, wherein.

In the drawings the same reference numerals have been used to indicate corresponding features.

Figure 3:
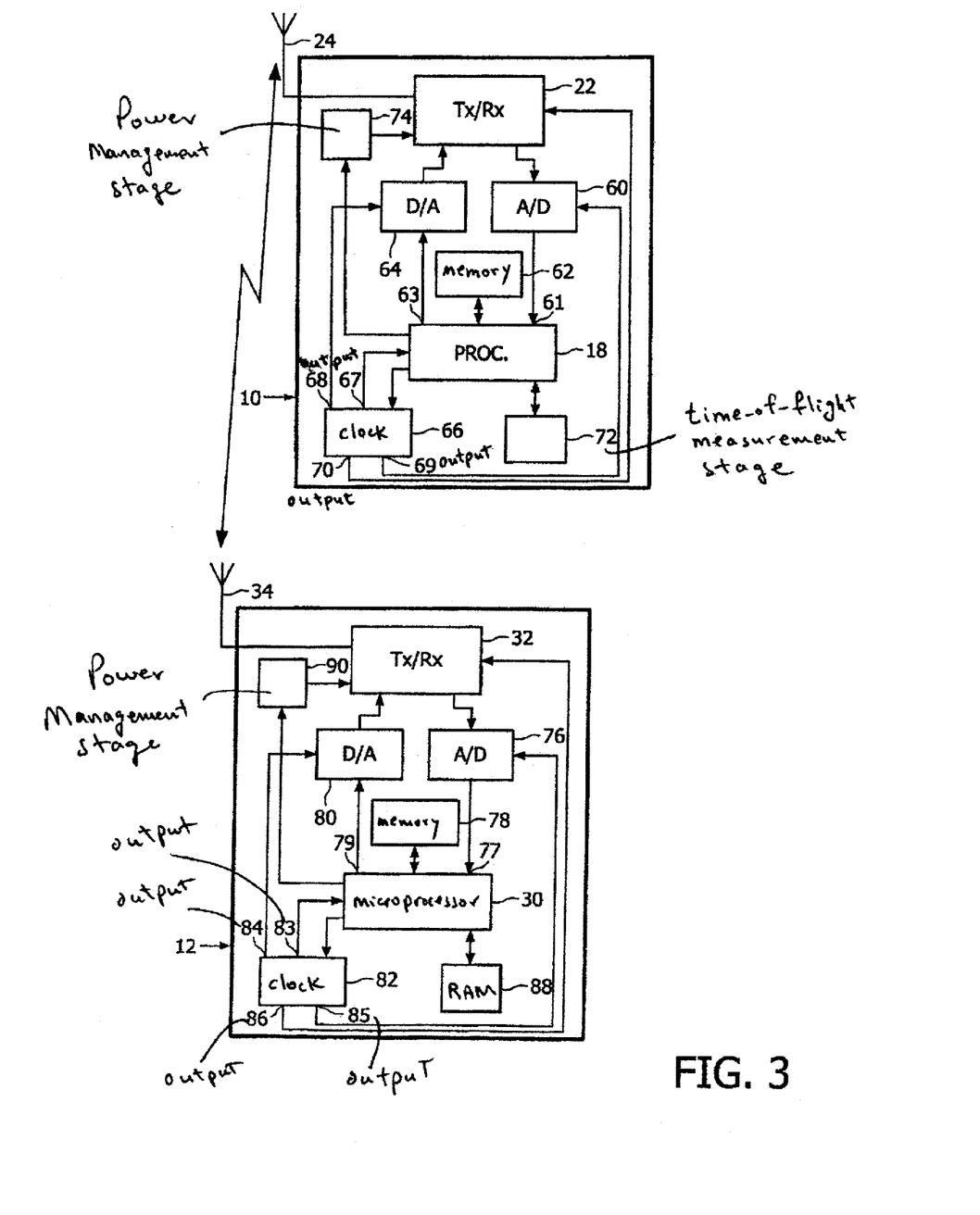
FIG. 3 is a block schematic diagram of a passive keyless access control system made in accordance with the present invention.

Referring to FIG. 3 the illustrated passive keyless access control system comprises a fixed part, which is mounted in a vehicle, and a portable part 12, which is carried by a user. For convenience of handling and storage, the portable part 12 may be implemented as a key fob or card.

The fixed part 10 comprises a UHF transceiver 22 coupled to a signal propagation device, for example an antenna 24. A receiver section of the transceiver 22 is coupled by way of an analog-to-digital converter (ADC) 60 to an input 61 of a processor 18 which operates in accordance with program software held in a program store 62. An output 63 of the processor 18 is coupled by way of a digital-to-analog converter (DAC) 64 to a transmitter section of the transceiver 22. A clock 66, controlled by the processor 18, has outputs 67, 68, 69 and 70 coupled respectively to the processor 18, the DAC 64, the ADC 60 and the transceiver 22. A time-of-flight measurement stage 72, which may be integrated with, or formed by, the processor, is coupled to the processor 18. A power management stage 74, controlled by the processor 18, has an output coupled to the transceiver 22.

The portable part comprises a UHF transceiver 32 coupled to a signal propagation device, for example an antenna 34. A receiver section of the transceiver 32 is coupled by way of an analog-to-digital converter (ADC) 76 to an input 77 of a microprocessor 30 which operates in accordance with program software held in a program store 78. An output 79 of the microprocessor 30 is coupled by way of a digital-to-analog converter (DAC) 80 to a transmitter section of the transceiver 32. A clock 82, controlled by the microprocessor 30, has outputs 83, 84, 85 and 86 coupled respectively to the processor 30, the DAC 80, the ADC 76 and the transceiver 32. A random access memory (RAM) 88 is coupled to the processor 30. A power management stage 90, controlled by the microprocessor 30, has an output coupled to the transceiver 32.

One mode of operation of the passive keyless entry system will now be described with reference to the flow chart shown in FIG. 4.

It will be assumed that a user has locked his vehicle and moved out-of-range of the transceiver 22. Block 100 relates to the processor generating a ranging signal which is transmitted by the transceiver 22. The frequency or frequencies used by the transceiver will be that one or one of those permitted by the radio regulatory authorities, for example a 1 MHz bandwidth signal in the frequency range 868 to 915 MHz or a 20 MHz spread spectrum signal in the ISM band around 2.4 GHz.

When the portable part 12 is in range, its transceiver 32 receives the ranging signal and its processor 30 generates a response signal which is transmitted by its transceiver 32.

Block 102 represents the fixed part receiving the response signal. Block 104 represents the processor 18 and the time-of-flight measurement stage 72 estimating the distance using a coarse algorithm, that is an algorithm which does not take into account clock offset, clock drift and timing information better than a single clock cycle thereby reducing the number and amount of register values that the processor 18 must maintain. The use of a coarse algorithm represents a power saving at the expense of accuracy at a time when it is not necessary to measure range precisely.

In block 106 a check is made to determine if the estimated distance is less than a preset threshold value corresponding to say a distance of 10 meters (from the vehicle). If the answer is no (N), the flow chart reverts to the block 104. Alternatively, if the answer is yes (Y), the flow chart continues to block 108 in which the distance is estimated using a precision algorithm which takes into account factors such as clock offset, clock drift and timing information better than a single clock cycle. The increase in accuracy in measuring range is at the expense of increased power consumption.

Block 110 relates to checking if the portable 12 is within the vehicle alarm disabling distance, say 1 metre. If the answer is no (N), the flow chart reverts to the block 108. If the answer is yes (Y) then block 112 represents the operations of disabling the vehicle alarm and unlocking at least the driver's door.

The switch from the coarse algorithm to the precise one is a matter of choice by a manufacturer. Optionally the threshold may be set at the side of the vehicle and corresponds to the alarm disabling distance. Once in the vehicle the precise algorithm is used because for applications, such as "keyless-go" when the engine can be started by the operation of a switch mounted in the vehicle or, remotely, by actuation of a start switch on the portable part, it is crucial to verify the location of the portable part to an accuracy of less than 1 metre.

Figure 4:
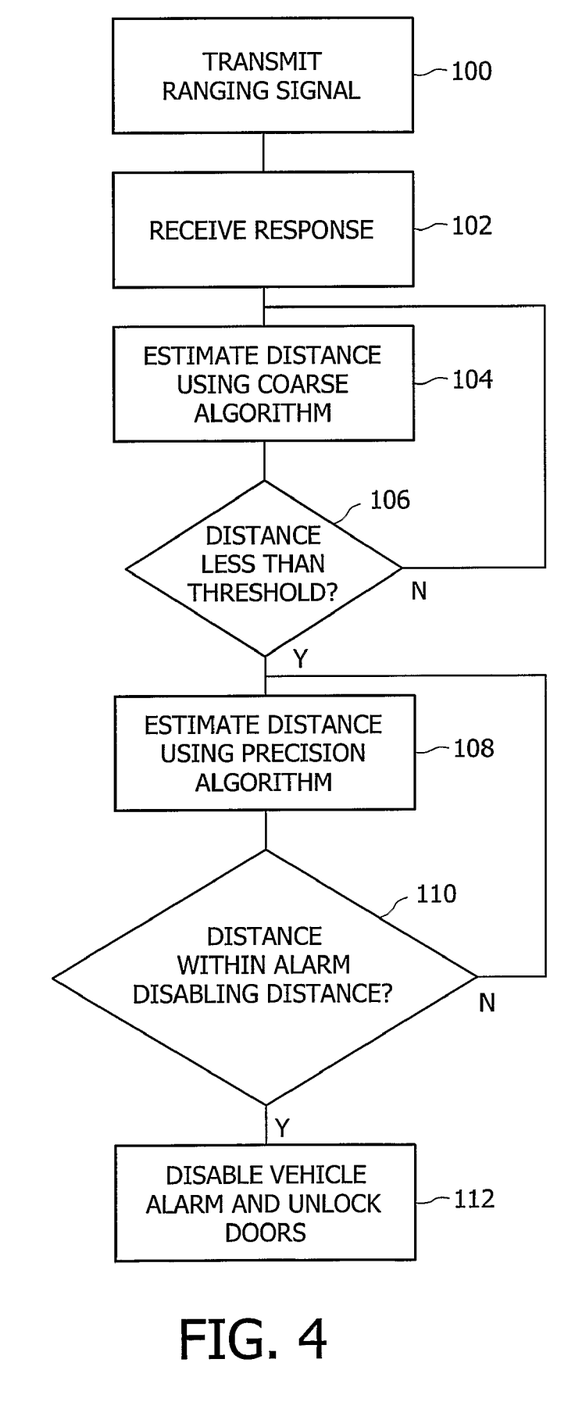
FIG. 4 is a flow chart illustrating one embodiment of the method in accordance with the present invention.

In variants/refinements of the method illustrated by the flow chart shown in FIG. 4, the clock speed in the fixed part is reduced when the portable part is beyond the threshold distance and increased when the portable part is closer and/or the power of the transmitter in the fixed part and, optionally, also the transmitter in the portable part, is changed from a high level, when beyond the threshold distance, to a low level, when within the threshold distance. The options are illustrated in the flow chart shown in FIG. 5, which is an enhancement of the flow chart shown in FIG. 4. Either one of these two refinements will enable power saving by both the fixed and portable parts when beyond the threshold distance.

There is a presumption that the local oscillator and carrier frequencies of the transceivers 22 and 32 are generated by frequency synthesisers having selectable multiplier ratios to obtain the same output frequency from different clock frequencies. A drawback to this approach is that any error in the clock frequency is amplified by a high multiplication ratio leading to a degradation in the measurement accuracy. In another variant the stability of the clock oscillator may be varied by switching-in clock stability circuits.

The switching of output powers of can be effected by way of the power management stages 74 and 90 (FIG. 3) in accordance with control signals generated by the processor 18 and microprocessor 30, respectively.

In order to enable the portable part 12 to switch clock frequencies and/or output powers substantially contemporaneously with the fixed part, appropriate control signals can be included in the ranging signals transmitted by the fixed part 10.

Figure 5:
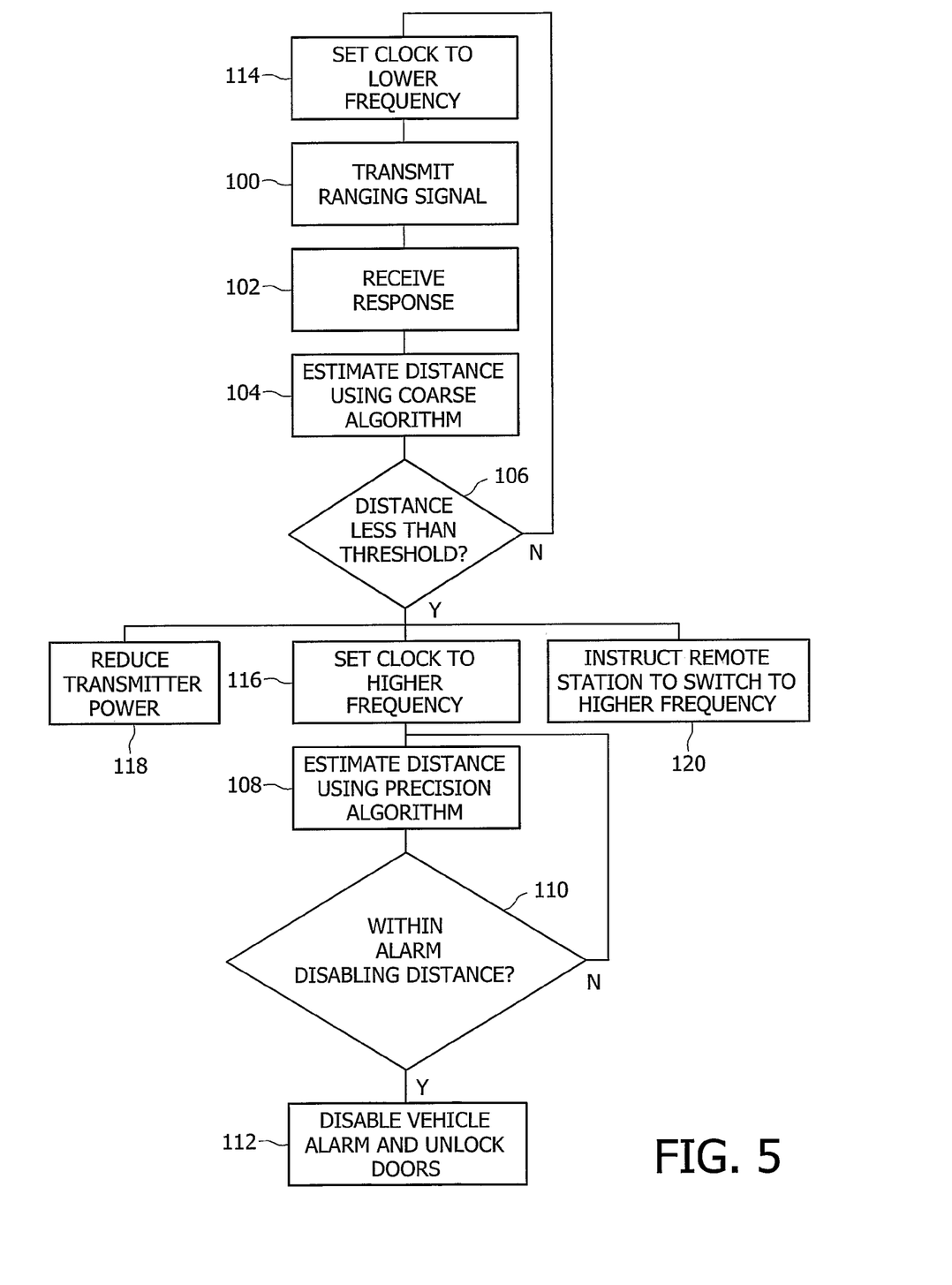
FIG. 5 is a flow chart illustrating a second embodiment of the method in accordance with the present invention.

Referring to FIG. 5, the flow chart commences with block 114 relating to the clock frequency of at least the fixed part 10 being set to a lower frequency causing the processor 18 to operate more slowly and for the frequency synthesiser multiplication ratio to be increased to maintain the transmitter frequency. Similar changes may effected in the portable part 12.

Block 100 relates to the fixed part 10 transmitting a ranging signal and block 102 relates to it receiving a response from the portable part 12. Block 104 relates to the distance being estimated using a coarse algorithm. Block 106 relates to checking if the estimated distance is less than a threshold value. If it is not (N) the flow chart reverts to the block 114. Alternatively, if the distance is less then the threshold (Y), the flow chart continues to a block 116 which relates to setting the clock frequency in the fixed part 10 to a higher frequency. Simultaneously with this operation, in the next ranging signal transmitted the fixed part 10 sends an instruction for the clock 82 in the portable part 12 to switch to a high frequency, block 120. Additionally, in block 118 the power of the transmitter section of the transceiver 22 is reduced and an instruction is sent to the portable part 12 to reduce the power of its transmitter.

In block 108 the distance is estimated using a precision algorithm. Block 110 relates to checking if the portable part 12 is within the alarm disabling distance. If the answer is no (N) the flow chart reverts to the block 108. However if the answer is yes (Y) the vehicle's alarm is disabled and at least one of the doors is unlocked.

Although the use of a single threshold distance has been referred to in the illustrated embodiments of the present invention, it is to be understood that the time-of-flight measuring stage and/or the processor 18 may store additional threshold values at which actions may be taken, such as the flashing of vehicle lights to alert a driver to the location of the vehicle, changing the quality of the distance estimating algorithm, changing the clock frequency and changing the transmitter power.

The method of measuring the time of flight is a known technique and assuming that the clocks 66 and 85 of the parts 10 and 12 are synchronised and that there are no internal time delays, the time of flight equals half the time between the transmission of a ranging signal and receiving a response. However because of the existence of internal group and digital delays this simple approach is not accurate. A method of calibrating a keyless entry system is disclosed in unpublished United Kingdom Patent Application 0404857.5 (Applicant's reference PHGB040054 GBP). In summary the fixed and portable parts are positioned within a known distance of each other and the time of flight is measured. An error in the measured time-of-flight due to the propagation delays in the circuitry of the respective parts is determined by deriving the difference between the measured time-of-flight and a theoretical time-of-flight over a known distance and using the difference to adjust the measured time-of-flight.

Other applications to which time-of-flight measurements may be used are tracking systems such as toddler alarms for use in ensuring that toddlers do not stray too far when out roaming, for example when shopping, and systems for tracking doctors, patients and equipment on large sites such as hospitals. In a parent/toddler or similar application the first part 10 would be carried by the parent and the second part 12 would be attached to the toddler. Calibration/recalibration could be effected by for example juxtaposing the first and second parts adjacent each other or spaced apart by a known distance or by introducing a known delay corresponding to a certain distance in the signal propagation path.

In a non-illustrated variant of the system shown in FIG. 3, a 125 kHz inductive transmitter/receiver system of a type similar to that shown in FIG. 1 may be provided in those applications where it is desired to generate challenge signals.

In the present specification and claims the word "a" or "an" preceding an element does not exclude the presence of a plurality of such elements. Further, the word "comprising" does not exclude the presence of other elements or steps than those listed.

From reading the present disclosure, other modifications will be apparent to persons skilled in the art. Such modifications may involve other features which are already known in the design, manufacture and use of time-of-flight ranging systems and component parts therefor and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

The invention claimed is:

1. A method of operating a time-of-flight ranging system comprising first and second stations having transmitting and receiving devices, the method comprising the acts of:
   the first station measuring a time-of-flight of a signal between the first and second stations based on a clock generated from a clock generator;
   calculating the time-of-flight using a first algorithm when the second station is at a first distance from the first station;
   calculating the time-of-flight in accordance with a second algorithm when the second station is at a second distance from the first station;
   wherein the first algorithm is coarser than the second algorithm, and the first distance is greater than the second distance,
   wherein the first algorithm does not take into account a clock offset of the clock, a clock drift of the clock and timing information better than a single clock cycle of the clock in determining the time-of-flight,
   wherein the second algorithm takes into account the clock offset of the clock, the clock drift of the clock and the timing information better than the single clock cycle of the clock in determining the time-of-flight.

2. The method as claimed in claim 1, further comprising the act of reducing a clock frequency of the clock when the second station is at the first distance from the first station.

3. The method as claimed in claim 1, further comprising the act of reducing the transmitting power of at least the first station when the second station is at the second distance from the first station.

4. A time-of-flight ranging system comprising first and second stations, each of the first and second stations having transmitting and receiving devices for communicating with each other, and a controller, a first station of said first stations further comprising a time-of-flight measuring device for determining a distance between itself and the second station based on a clock generated from a clock generator, the measuring device being adapted to calculate a time-of-flight of a signal between the first station and the second station in accordance with a first algorithm when the second station is at a first distance from the first station and to calculate the time-of-flight in accordance with a second algorithm when the second station is at a second distance from the first station;
   wherein the first algorithm is coarser than the second algorithm, and the first distance is greater than the second distance,
   wherein the first algorithm does not take into account a clock offset of the clock, a clock drift of the clock and timing information better than a single clock cycle of the clock in determining the time-of-flight, and
   wherein the second algorithm takes into account the clock offset of the clock, the clock drift of the clock and the timing information better than the single clock cycle of the clock in determining the time-of-flight.

5. The time-of-flight ranging system as claimed in claim 4, wherein the clock generator for generates a first clock frequency and a second clock frequency, and wherein the controller in the first station is responsive to the selected first or second algorithm for selecting respectively the first clock frequency or the second clock frequency, wherein the first clock frequency is less than the second clock frequency.

6. The time-of-flight ranging system as claimed in claim 5, wherein the transmitting device is configured to produce a transmission frequency from the clock generator.

7. The time-of-flight ranging system as claimed in claim 4, wherein at least the first station further comprises a transmitting power management device for adjusting a transmitting power between a first level when the first algorithm is being used to calculate the time-of-flight and a second level when the second algorithm is being used to calculate the time-of-flight, wherein the first level is higher than the second level.

8. The time-of-flight ranging system as claimed in claim 4, wherein at least one of the first station and the second station further comprises a transmitting power management device for adjusting a transmitting power between a first level when the first algorithm is being used to calculate the time-of-flight and a second level when the second algorithm is being used to calculate the time-of-flight.

9. The time-of-flight ranging system as claimed in claim 4, wherein the clock generator generates a first clock frequency and a second clock frequency, the first clock frequency being less than the second clock frequency, wherein the controller in the first station is responsive to the selected first or second algorithm for selecting respectively the first clock frequency or the second clock frequency, and wherein at least the first station has a transmitting power management device for adjusting a transmitting power between at least a first level when the first algorithm is being used to calculate the time-of-flight and a second level when the second algorithm is being used to calculate the time-of-flight.

10. The time-of-flight ranging system as claimed in claim 4, wherein at least one of the first station and the second station further comprises a transmitting power management device for adjusting a transmitting power between at least a first level when the first algorithm is being used to calculate the time-of-flight and a second level when the second algorithm is being used to calculate the time-of-flight, wherein the first level is higher than the second level.

11. A keyless access control system comprising first and second stations, each of the first and second stations having transmitting and receiving devices for communicating with each other, and a controller, the first station further comprising a time-of-flight measuring device for determining a distance between itself and the second station based on a clock generated from a clock generator, the measuring device being adapted to calculate a time-of-flight of a signal between the first station and the second station in accordance with a first algorithm when the second station is at a first distance from the first station and to calculate the time-of-flight in accordance with a second algorithm when the second station is at a second distance from the first station, wherein the first algorithm is coarser than the second algorithm, and the first distance is greater than the second distance,
   wherein the first algorithm does not take into account a clock offset of the clock, a clock drift of the clock and timing information better than a single clock cycle of the clock in determining the time-of-flight, and
   wherein the second algorithm takes into account the clock offset of the clock, the clock drift of the clock and the timing information better than the single clock cycle of the clock in determining the time-of-flight.

12. A vehicle security system comprising a lockable security device responsive to locally generated signals and a keyless access control system comprising a fixed first part to be mounted in a vehicle and a portable second part to be carried by a vehicle user, both said fixed first and portable second parts having signal transmitting and receiving devices for effecting communication with each other, and a controller, the fixed first part further comprising a time-of-flight measuring device for determining a distance between itself and the portable second part based on a clock generated from a clock generator, the measuring device being adapted to calculate a time-of-flight of a signal between the fixed first part and the portable second part in accordance with a first algorithm when the portable second part is at a first distance from the fixed first part and to calculate the time-of-flight in accordance with a second algorithm when the portable second part is at a second distance from the fixed first part, wherein the first algorithm is coarser than the second algorithm, and the first distance is greater than the second distance, wherein the first algorithm does not take into account a clock offset of the clock, a clock drift of the clock and timing information better than a single clock cycle of the clock in determining the time-of-flight, and wherein the second algorithm takes into account the clock offset of the clock, the clock drift of the clock and timing information better than the single clock cycle of the clock in determining the time-of-flight.

* * * * *